United States Patent [19]

Jensen

[11] 3,898,633

[45] Aug. 5, 1975

[54] ANALOG MEMORY RETENTION TIME EXTENDER

[75] Inventor: Garold K. Jensen, Alexandria, Va.

[73] Assignee: The United States of America as represented by the Secretary of the Navy, Washington, D.C.

[22] Filed: Apr. 2, 1969

[21] Appl. No.: 812,934

Related U.S. Application Data

[63] Continuation-in-part of Ser. No. 649,792, June 27, 1967.

[52] U.S. Cl............ 340/173 R; 320/1; 340/173 CA

[51] Int. Cl.²........................................ G11C 11/24

[58] Field of Search........... 320/1; 328/78; 340/173, 340/173 CA

[56] References Cited

UNITED STATES PATENTS 3,098,214 7/1963 Windes et al. ......................... 320/1

*Primary Examiner*—Stuart N. Hecker

*Attorney, Agent, or Firm*—R. S. Sciascia; Arthur L. Branning

[57] ABSTRACT

A circuit for use with radar matrix capacitor storage devices which functions both to place newly received echo signals into the storage and to compensate for the decay of stored signals.

3 Claims, 2 Drawing Figures

INVENTOR
GAROLD K. JENSEN

BY

ATTORNEYS

INVENTOR
GAROLD K. JENSEN
BY
ATTORNEYS

ANALOG MEMORY RETENTION TIME EXTENDER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is a continuation-in-part of application Ser. No. 649,792 filed June 27, 1967.

BACKGROUND OF THE INVENTION

The above-mentioned prior application disclosed a phase coherent, pulse-doppler radar system wherein signals obtained by processing target echoes are stored in matrices, the basic storage elements of which are capacitors. Although precautions are taken to preserve the stored signal, the retention time is inherently limited because the stored signals decay with the passage of time due to leakage. The invention described herein compensates for this unsatisfactory decay in the prior storage system and allows radar signals to be stored as long as desired.

SUMMARY OF THE INVENTION

The general purpose of this invention is to provide a circuit which extends the retention time of signals in a capacitor storage matrix and has the capability of both writing in new signals and erasing old signals. While it will be obvious that this circuit has a more general utility, it has been developed and will be described in connection with a phase coherent, pulse-doppler radar system.

To attain its purpose, the present invention contemplates a unique gate circuit which includes two branches, both of which are connected to the input side of the capacitor matrix. The first branch provides a gated path by which new signals are placed in the matrix store while the second branch includes pulse controlled gates whereby the signals already in the matrix store are either rewritten with increase strength or are ereased as desired.

OBJECTS OF THE INVENTION

It is, therefore, an object of this invention to provide an improved capacitor matrix storage system.

Another object is the provision of a circuit, suitable for use with a capacitor matrix storage system in a radar, which compensates for the decay of signals stored in the matrix.

Still another object is to provide a circuit which compensates for the decay of signals stored in a capacitor matrix storage system and which allows new signals to be placed in the matrix store.

A still further object is to provide a gated circuit which is suitable for use with a capacitor matrix storage system in a radar and which functions to add new signals to the storage and to erase stored signals and to rewrite with increased strength the signals stored in the matrix.

BRIEF DESCRIPTION OF THE DRAWINGS

Other objects and advantages of the invention will hereinafter become more fully apparent from the following description and the annexed drawings wherein.

DESCRIPTION OF THE PREFERRED EMBODIMENT

Figure 1:
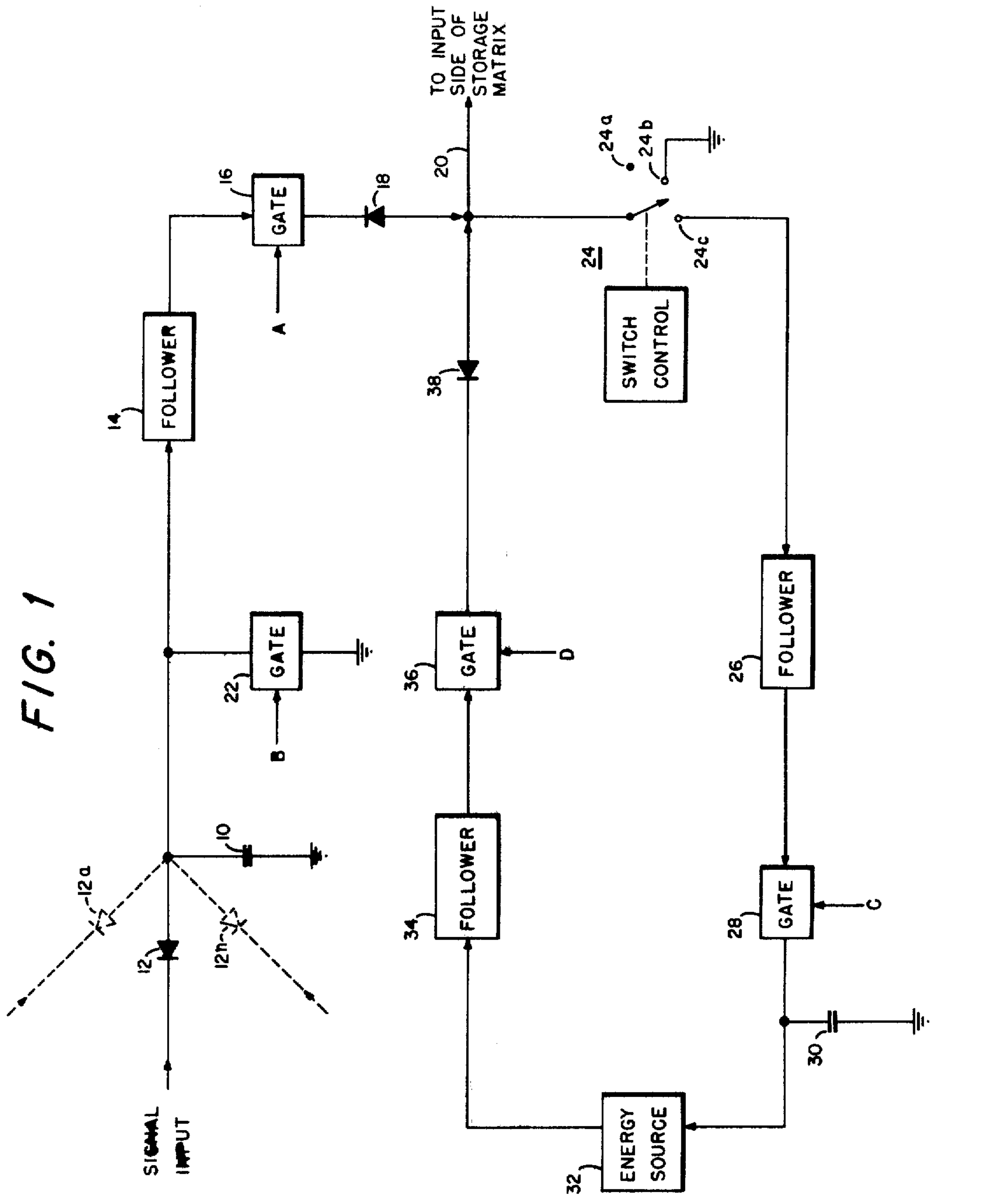
FIG. 1 illustrates a preferred embodiment of the invention in block diagram form and FIG. 2 shows wave forms which are useful in explaining the operation of the invention.

Referring now to the block diagram circuit shown in FIG. 1, which is a preferred embodiment of the invention, the input signal is typically obtained from the analysis section of the radar described in the previously mentioned prior application. In contrast to this prior described radar wherein the output of the analysis section was directly connected to storage matrices, the present invention contemplates that the circuit of FIG. 1 will be placed between the analysis section and the storage matrices.

As shown in FIG. 1, the input signal charges the capacitor 10 through diode 12. If the radar is operating in a collapsing parameter mode, such as a collapsing range scan mode, the input signal may arrive through any of a multitude of diodes **12, 12*a* . . . 12*n*. The signal on capacitor 10 is periodically connected to the input side of the storage matrix through follower 14, which functions in the customary manner to provide the desired input and output impedances, gate 16 which is controlled by the voltage A, diode 18 and lead 20. The signal on capacitor 10 is also periodically connected to ground, and thereby erased, through the gate 22 which is controlled by voltage B. It will be evident that the branch comprising diodes 12 and 18, capacitor 10, gates 16 and 22 and follower 14** function to place the input signals in the storage matrix.

The matrix input lead 20 is also connected to a controlled switch 24. Although it is contemplated that switch 24 will usually be automatically controlled, it is certainly obvious that manual control of this switch may at times be desirable. As illustrated, switch 24 has three terminals, **24*a***, *b* and *c*. The terminal **24*a* is open, and has no effect on the storage matrix. The terminal 24*b* is grounded and when connected to the matrix input lead 20** functions to erase signals stored in the matrix.

At this time it may be helpful to the reader to briefly describe the storage matrix which is described in more detail in application Ser. No. 649,792. As there described, the storage matrix includes a plurality of capacitor storage elements which can be conveniently illustrated and are often physically arranged in the matrix form. In the input or write-in portion of the matrix the individual capacitor storage elements are sequentially and repetitively connected through gating circuits to a source of signals. Similarly, but independently and usually at a different rate than the input, the output or read-out portion of the matrix sequentially connects, by gating circuits, the individual capacitor storage elements to a display device, which is often a cathode ray tube. The output portion is designed to minimize the "nibbling away" of the stored signal caused by the repetitive connection of the display device.

When switch terminal **24*c* is connected to input lead 20, the individual capacitor storage elements of the matrix are sequentially connected to follower 26, which functions to provide the desired impedance matching. Follower 26 is in turn connected through fast acting gate 28, which operates under the control of voltage C to sample the signal level on lead 20 and to charge capacitor 30** to the level of the capacitor storage element then in the write-in status.

Capacitor 30 is connected to energy source 32 which can be an amplifier that raises the signal from capacitor 30 a predetermined percentage, i.e. the gain of the amplifier. Alternatively, energy source 32 can be a constant voltage source that produces a predetermined voltage level output signal whenever the capacitor 30 is charged above a threshold value. The output of energy source 32 is connected to that capacitor storage element then in the write-in status through follower 34, gate 36 which is controlled by voltage D, diode 38 and matrix input lead 20.

It is, no doubt, by now evident that the contemplated function of the branch or loop containing switch 24, followers 26 and 34, gates 28 and 36, capacitor 30, energy source 32 and diode 38 is to either leave the storage matrix undisturbed (switch position 24*a*), erase signals from the matrix storage elements (switch position 24*b*) or increase the signal level in the matrix storage elements (switch position 24*c*).

Figure 2:
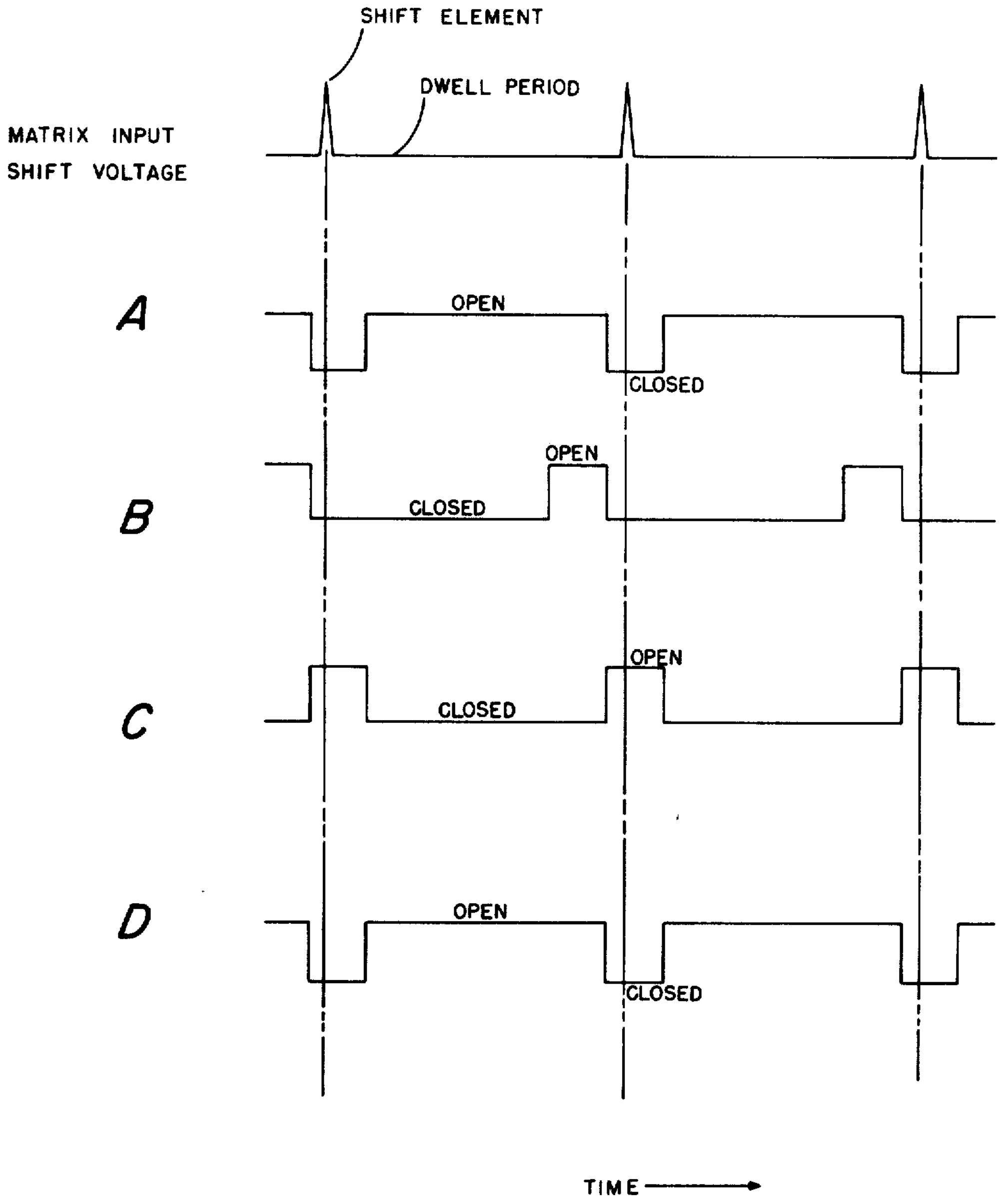

The operation of the invention will be more apparent by referring to the voltage wave forms shown in FIG. 2. The top curve pertains to the operation of the write-in portion of the storage matrix and shows a series of voltage pulses. Each pulse causes the input lead 20 to be disconnected from one capacitor storage element and connected to another capacitor storage element which remains so connected during the dwell period preceding the next voltage pulse. The dwell period is typically 60 microseconds. Signals A and D, which are identical, function to close gates 16 and 36 and thereby prevent signals from reaching the input lead 20 when the storage matrix is being shifted. These gates are opened during most of the dwell period, thereby allowing new signals to reach lead 20 through gate 16 and strengthened signals to reach lead 20 through gate 36. Signal B opens gate 22 during the latter portion of the dwell period and thereby erases any signal which may be on capacitor 10. Gate 22 is at other times closed and does not disturb any signal which is in capacitor 10. Signal C causes gate 28 to be open during the initial part of the dwell period and thereby causes the signal which is on the newly connected capacitor storage element to charge capacitor 30. This charge on capacitor 30 is strengthened by energy source 32 and, when gate 36 is opened, is rewritten into the capacitor storage element during the subsequent portion of the dwell period.

There has been described a preferred embodiment of the invention wherein two gate controlled branches are connected to the input side of a storage matrix. The first branch provides a path by which new signals are placed in the storage matrix while the second branch includes means whereby the signals already in the matrix store can be either rewritten with increased strength or erased.

It should be understood, of course, that the foregoing disclosure related to only a preferred embodiment of the invention and that numerous modifications or alterations may be made therein without departing from the spirit and the scope of the invention as set forth in the appended claims.

What is claimed and desired to be secured by Letters Patent of the United States is:

1. An electrical circuit for use with a capacitor storage matrix comprising:

an input lead connecting said electrical circuit and the input side of said storage matrix:

first branch means connected to said input lead and functioning to receive new signals and to provide a path for said new signals to said input lead and including:

a capacitor connected to be charged by said new signals and gating means which function to periodically discharge said capacitor and second branch means connected to said input lead and functioning to either increase the strength of signals in said input lead or to erase signals in said input lead and including a three position switch, the first switch position connecting said input lead to an open circuit, the second switch position connecting said input lead to ground and the third switch position connecting said input lead to a closed circuit which includes an energy source.

2. The electrical circuit of claim 1 wherein said closed circuit further includes gating and storage means connected to the input of said energy source and gating means connected to the output of said energy source whereby, when said switch is in the third position, the signals on said input lead are periodically sampled and stored by said gating and storage means and, after being strengthened by said energy source, are periodically applied to said input lead through the gating means connected to the output of said energy source.

3. An electrical circuit for use with a capacitor storage matrix wherein individual capacitor storage elements are sequentially connected during repetitive dwell periods to a matrix input lead, comprising:

first branch means for placing new signals into said matrix input lead and including a path that includes a first diode, a first follower, a first periodically opened gate and a second diode, all connected in series, and further including a first capacitor and a second periodically opened gate connected in parallel between said first diode and ground whereby new signals are stored in said first capacitor and are periodically connected to said matrix input lead by said first gate and are periodically erased by said second gate and second branch means for erasing or strengthening signals in said matrix input lead and including a second follower, a third periodically opened gate, an energy source, a third follower, a fourth periodically opened gate and a third diode, all connected in series, and further including switch means for connecting said input lead to ground or to said second follower and a second capacitor connected between the output of said third gate and ground, whereby signals in said input lead are erased when said switch means connects said input lead to ground and are strengthened when said switch means connects said input lead to said second follower.

* * * * *